(12) United States Patent
Thekkethil

(10) Patent No.: US 8,079,092 B2
(45) Date of Patent: Dec. 13, 2011

(54) ELECTRO-MECHANICAL SYSTEM FOR NON-DUPLICATION OF SOFTWARE

(75) Inventor: Geroge John Thekkethil, Bangalore (IN)

(73) Assignee: M/s. Trinity Future—In PVT. Ltd., Bangalore (IN)

( * ) Notice: Subject to any disclaimer, the term of this patent is extended or adjusted under 35 U.S.C. 154(b) by 1143 days.

(21) Appl. No.: 11/571,918

(22) PCT Filed: Apr. 12, 2006

(86) PCT No.: PCT/IN2006/000121
§ 371 (c)(1),
(2), (4) Date: Jan. 10, 2007

(87) PCT Pub. No.: WO2007/013091
PCT Pub. Date: Feb. 1, 2007

(65) Prior Publication Data
US 2008/0307410 A1    Dec. 11, 2008

(30) Foreign Application Priority Data
Jul. 25, 2005 (IN) .......................... 1000/CHE/2005

(51) Int. Cl.
*G06F 21/00* (2006.01)
(52) U.S. Cl. .......................................... 726/32; 726/26
(58) Field of Classification Search ..................... 726/32
See application file for complete search history.

(56) References Cited

U.S. PATENT DOCUMENTS

| | | | |
|---|---|---|---|
| 4,634,807 A | | 1/1987 | Chorley et al. |
| 5,113,522 A | * | 5/1992 | Dinwiddie et al. ........... 713/375 |
| 5,896,454 A | * | 4/1999 | Cookson et al. ................ 360/60 |
| 6,591,367 B1 | * | 7/2003 | Kobata et al. ..................... 726/31 |
| 2002/0056031 A1 | * | 5/2002 | Skiba et al. ..................... 711/162 |
| 2004/0153416 A1 | * | 8/2004 | Fujimoto ......................... 705/59 |
| 2004/0153539 A1 | * | 8/2004 | Lyon et al. ..................... 709/224 |
| 2004/0260751 A1 | * | 12/2004 | Schloesser ..................... 709/200 |
| 2005/0015498 A1 | * | 1/2005 | Okazawa et al. ............. 709/227 |
| 2005/0060569 A1 | * | 3/2005 | Uesugi et al. ................. 713/200 |
| 2005/0063674 A1 | * | 3/2005 | Bilinski et al. .................. 386/94 |
| 2005/0081064 A1 | * | 4/2005 | Ooi et al. ....................... 713/202 |
| 2005/0089164 A1 | * | 4/2005 | Lang et al. ..................... 380/201 |
| 2005/0210278 A1 | | 9/2005 | Conklin et al. |
| 2005/0216685 A1 | * | 9/2005 | Heden et al. .................. 711/163 |

FOREIGN PATENT DOCUMENTS

| | | |
|---|---|---|
| DE | 101 05 363 | 8/2002 |
| EP | 0 062 438 | 10/1982 |
| EP | 0 109 504 | 5/1984 |
| EP | 0 171 456 | 2/1986 |
| JP | 11-24917 | 1/1999 |
| WO | WO 2004/051390 | 6/2004 |

* cited by examiner

*Primary Examiner* — David García Cervetti
*Assistant Examiner* — Ghazal Shehni
(74) *Attorney, Agent, or Firm* — Hamre, Schumann, Mueller & Larson, P.C.

(57) ABSTRACT

A system consisting of a memory storage unit in which the licensed softwares are stored. The function of this device is to recognize the requested data and thereby allow the software from the memory storage unit according to the instructions set to this device. It is an effective means for protecting the software in the device from duplication.

8 Claims, 1 Drawing Sheet

ELECTRO-MECHANICAL SYSTEM FOR NON-DUPLICATION OF SOFTWARE

FIELD OF THE INVENTION

The present invention generally relates to an electromechanical system for Non-Duplication of Software. More particularly for preventing copying of software files the present invention provides an electromechanical system for the installation of software to a computer without the need for a CD.

The present invention provides a chip useful for Non-Duplication of softwares to be installed onto a computer.

BACKGROUND ART

Software is one of the most valuable technologies of the Information Age, running everything from PCs to the Internet. Yet, because software has become such an important productivity tool, the illegal duplication and distribution of software persists globally. Software is important to every business, government, school and consumers. Most retail programs are licensed for use at just one computer site or for use by only one user at any time. By buying the software, you become a licensed user rather than an owner. You are allowed to make copies of the program for backup purposes, but it is against the law to give copies to friends and colleagues.

Unauthorized copying/installation of Software is all but impossible to stop, although software companies are launching more and more lawsuits against major infractors. Originally, software companies tried to stop unauthorized use of software by copy-protecting their software. This strategy failed, however, because it was inconvenient for users and was not 100 percent foolproof. Most software now requires some sort of registration, which may discourage would-be pirates, but doesn't really stop unauthorized usage of software.

Reference may be made to the US Publication No. 2005 0216685 A1 Heden, Donald Gene; et al, wherein it has been disclosed that:—The Intelligent Media Storage System disclosed herein protects computer programs and/or data files from being copied and used in an unauthorized manner. According to an example embodiment of the invention, an Intelligent Control Element (ICE) is installed between a computer system and a mass storage device. In a preferred embodiment, the ICE is disposed between a media storage device interface and the computer system interface. The ICE is responsible for writing data to and reading data from the protected mass storage devices of the IMSS. The ICE writes to and reads from the mass storage devices using special coding and encryption mechanisms. Each IMSS ICE uses different keys to code and encrypt data stored onto the mass storage device. Protected data is prepared for installation on an individual IMSS installed in one specific computer system, which is not usable by any other computer system (even when that other computer system is also equipped with another IMSS). In some embodiments, the mass storage interfaces are partitioned into separate protected and unprotected mass storage interfaces. In embodiments where associated interfaces are partitioned, the unprotected mass storage interfaces are controlled either directly by the system, or indirectly (as logical mass storage interfaces) by the ICE. In contrast, the protected mass storage interfaces are always physically restricted from being directly accessible from the system interface, and are generally controlled only by the ICE. In other embodiments, coding and encryption by the ICE of data stored onto protected mass storage connected to the IMSS provides another level of protection. The interface protocol implemented by the ICE is proprietary and is licensed only to software manufactures and distributors, which provides yet another level of protection. The use of standard mass storage read commands (i.e., non-IMSS ICE read commands) upon hard drives and devices written to by an IMSS will cause only coded and encrypted data from the protected mass storage device to be read. Although backup copies of the protected (i.e., coded and/or encrypted) files may be made, such copies are useless for any other purpose, as they will contain the coded/encrypted data that only the originating IMSS can decode or decipher. Thus, copies of protected programs and/or data files made for legitimate backup purposes cannot be used for any other purpose.

Here we can see that the data file access in IMSS is allowed through authentication code system operating through ICE. ICE could be attached along with Hard Drive, CD, DVD Flash Drive Etc. The Main drawback of this invention is, it allows read or write file creation, data coding, copying, deleting and encryption of files from IMSS like any other conventional storage media. Secondly this invention works mostly only on software security with minimal use of hardware security.

OBJECTS OF THE INVENTION

It is thus the main object of our present invention is to provide an electromechanical system for Non-Duplication of Softwares, which obviates the drawbacks of the prior art.

Main object of our present invention is to provide an electronic system for Non-Duplication of Softwares, which obviates the drawbacks of the prior art.

Another object of the present invention is to provide an electromechanical system for Non-Duplication of Softwares useful for preventing copying of files of that software to be installed in any computer.

Another object of the present invention is to provide an electronic system for Non-Duplication of Softwares useful for preventing copying of files of that software to be installed in any computer.

Still another object of the present invention is to provide an electromechanical system for Non-Duplication of Softwares useful for preventing in the unauthorized installation of licensed software to a computer.

Still another object of the present invention is to provide an electronic system for Non-Duplication of Softwares useful for preventing in the unauthorized installation of licensed software to a computer.

A still further object of the present invention is to provide a MEMS based chip for Non-Duplication of Softwares.

An object of the present invention is to provide a MEMS based chip useful for installation in a computer.

Yet another object of the present invention is to provide a MEMS based chip for installation in a desktop computer.

Still another object of the present invention is to provide a MEMS based chip for installation in a laptop.

Yet another object of the present invention is to provide a MEMS based chip for installation in a notebook.

Yet another object of the present invention is to provide a MEMS based chip for installation in a PDA.

Still further object of the present invention is to provide an electromechanical/electronic system useful for preventing the unauthorized installation of licensed software to a desktop computer.

Yet further object of the present invention is to provide an electromechanical/electronic system useful for preventing the unauthorized installation of licensed software to a laptop computer.

Yet another object of the present invention is to provide an electromechanical/electronic system useful for preventing the unauthorized installation of licensed software to a notebook.

Yet another object of the present invention is to provide an electromechanical/electronic system useful for preventing the unauthorized installation of licensed software to a PDA.

Another object of the present invention is to provide an electromechanical/electronic system useful for preventing copying of software files on to a desktop computer.

Still other object of the present invention is to provide an electromechanical/electronic system useful for preventing copying of software files on to a laptop computer.

Yet another object of the present invention is to provide an electromechanical/electronic system useful for preventing copying of software files on to a notebook computer.

Yet another object of the present invention is to provide an electromechanical/electronic system useful for preventing copying of software files on to a PDA.

SUMMARY OF THE INVENTION

The present invention is to provide an electromechanical system for non-duplication of software useful for preventing the unauthorized installation/copying of licensed software to a computer. This electromechanical system can be miniaturized to a MEMS chip which can be easily operated on any computers. This electromechanical system can replace the CDs for installation/reinstallation of software.

Thus according to the basic aspect of the present invention, it provides an electromechanical system for non-duplication of software which comprises of:
the host system is one in which the system can request and receive the software from the software storage zone;
the processor which compare the instructions from the instruction zone;
the controller that controls the switch by the control signal;
the software is stored in software storage zone;

Thus the above method of We present invention is adapted for non-duplication of software. The device comprises of a processor, controller, instruction unit, switches and the storage unit or zone, which is integrated on Micro Electro Mechanical System chip.

Additional details of the above-described method for creating and using the electromechanical system for non-duplication of audio files is provided below:

BRIEF DESCRIPTION OF THE DRAWINGS

In the drawing accompanying this specification

DETAILED DESCRIPTION

Figure 1:
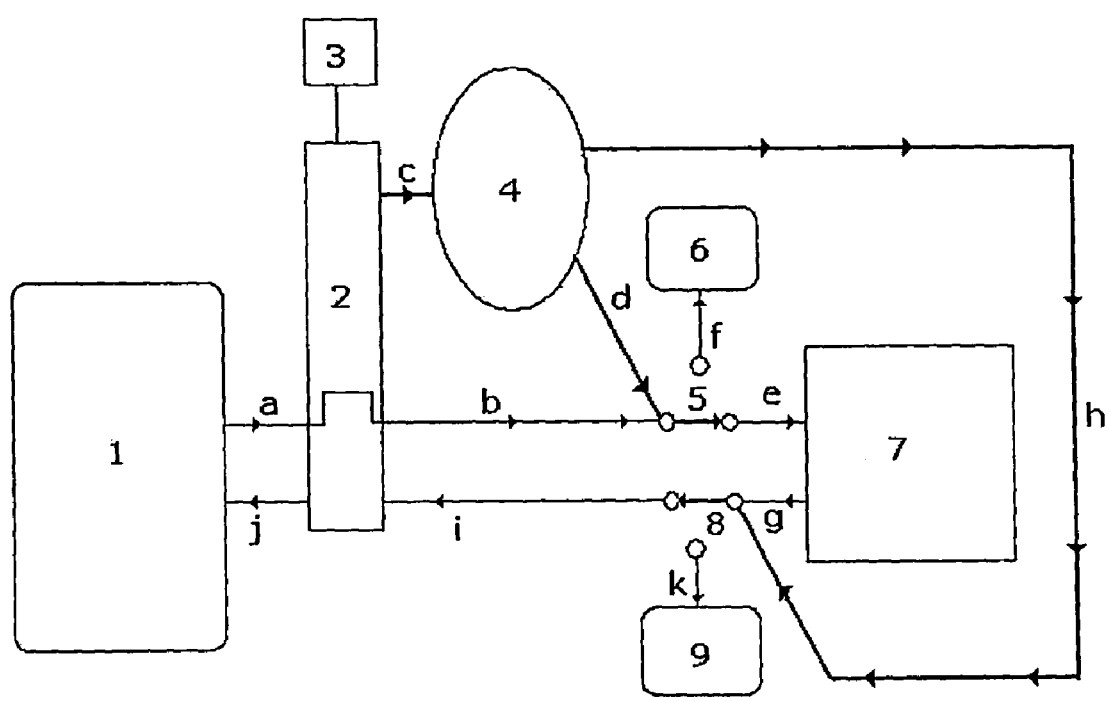
FIG. 1 shows an embodiment of the electromechanical system containing software for installation into a host system such as a computer, desktop, laptop, notebook and the like. (1) The host system is one in which the system can request and receive the software from the software storage zone (7). (2) is the processor, which compare the instructions from the instruction zone (3). (4) is the controller that controls the switch (5) and switch (8) by the signal (d) and signal (h). Software is stored in software storage zone (7). There is no-information present in zone (6) and zone (9).

Accordingly the present invention provides a licensed software in an electromechanical system loadable without a CD, which comprises: a processor (2) receiving the request data (a) from the host system (1). The processor (2) compares the instructions from the instruction zone (3) and processes the requesting data (a) accordingly. The processed signal (c) is sent to the controller (4) and the processed data (b) is sent to the switch (5) that is controlled by the controller (4). The controller (4) thereby sends the processed signal to the switch (5). If the requested data (a) is to duplicate the software present in the software storage zone (7) the switch (5) switches to the no-information zone (6). If the requested data (a) is correct or non-duplicable of the software present in the software storage zone (7) then the switch (5) switches directly into the software storage zone (7). According to non-duplicated request the software storage zone (7) sends data back to the host system (1) through the processor (2). During the transfer of the software to the host system (1), if the processor (2) understands if another duplication request is requested to the processor (2) then the processor (2) sends a signal (c) to the controller (4) to turn OFF the switch (8) to a no-information zone (9) by the signal (h) from the controller (4) whereas the non-duplicated request would be allowed directly through the channel (j) into the host system from the processor (2).

In an embodiment of the present invention the known software may be such any licensed software.

In still another embodiment of the present invention the system may be such as a computer.

In yet another embodiment of the present invention the computer may be such as a desktop, a laptop, a notebook, a PDA.

According to the invention, the electromechanical/electronic means functions per the following steps:
a. The electromechanical system is mounted on a host system or a computer, wherein the computer may be a desktop, a laptop, a notebook, or a PDA.
b. The host system (1) sends a request data (a) to the processor (2).
c. The processor (2) compares the requested data with the instructions from the instruction zone (3).
d. The processed signal (c) is sent to the controller (4).
e. The controller (4) thereby sends the controlled signal (d) to the switch (5) to control the switch (5) in which the processed data (b) reach switch (5) from processor (2).
f. If the requested data (a) is to duplicate the audio file present in the software storage zone (7) the switch (5) switches to the no-information zone (6).
g. If the requested data (a) is correct or non-duplicable of the software present in the software storage zone (7) then the switch (5) switches directly into the software storage zone (7).
h. According to non-duplicated request the software storage zone (7) sends data back to the host system (1) through the processor (2).
i. During the transfer of the software to the host system (1), if the processor (2) understands if another duplication request is requested to the processor (2) then the processor (2) sends a signal (c) to the controller (4) to turn OFF the switch (8) to a no-information zone (9) by the signal (h) from the controller (4).
j. The non-duplicated request would be allowed directly through the signal (j) into the host system from the processor (2).

The following example is given by way of illustration only and should not be construed to limit the scope of the invention.

EXAMPLE-1

An application software was stored in the external memory of the device. Here the computer is the host system in which the software has to be installed. The computer allow only "Enter" keyboard button to access the software present in the external memory to be installed on to the computer, any other button or instructions from the keyboard generates "invalid button clicked" option on to the display thereby protecting the software present in the device. Hence duplication/coping of this software is negated.

ADVANTAGES OF THE INVENTION

1. The electromechanical system of the present invention prevents copying of licensed software to computer.
2. The system can be miniaturized to a chip configuration.
3. The electromechanical system integrated into a chip can be operated easily on any desktop, laptop, notebook and the like.
4. The electromechanical system can replace the CDs for installation/reinstallation of software.

The invention claimed is:

1. A system for non-duplication of software, comprising:
a host system;
an electromechanical system mounted on the host system, the electromechanical system includes:
a software storage zone connected to the host system and from which the host system can request and receive software stored in the software storage zone;
a software request channel connecting the host system to the software storage zone;
a software receive channel, separate from the software request channel, connecting the software storage zone to the host system;
a first switch in the software request channel controlling the transmission of software requests over the software request channel from the host system, and a second switch in the software receive channel, separate from the first switch, controlling the transmission of software over the software receive channel to the host system;
the first switch and the second switch are disposed between the host system and the software storage zone;
a processor physically separate from the first and second switches and connected to the software request channel and the software receive channel between the host system and the first and second switches;
an instruction zone connected to the processor, the instruction zone storing instructions for processing software requests from the host system; and
a switch controller connected to the processor and to the first and second switches for controlling the first and second switches.

2. The system as claimed in claim 1, wherein the electromechanical system further includes a first no-information zone associated with the first switch and a second no-information zone, separate from the second no-information zone, associated with the second switch, wherein the first switch can selectively direct a software request from the host system to the software storage zone or to the first no-information zone, and the second switch can selectively direct software from the software storage zone to the second no-information zone or to the host system.

3. The system as claimed in claim 1, wherein the electromechanical system is integrated on a card that is installed in the host system.

4. The system as claimed in claim 1, wherein the electromechanical system is integrated on an electronic chip that is installed in the host system.

5. The system as claimed in claim 1, wherein the host system is a computer, a laptop computer, a desk top computer, a notebook computer, or a device with a digital external interface.

6. The system as claimed in claim 1, wherein the software storage zone is a flash memory, a hard disk, an eprom, an eeprom, a random-access memory, a disc, or a chip.

7. The system as claimed in claim 1, wherein the first and second switches are electromechanical switches.

8. The system as claimed in claim 1, wherein the software receive channel and the software request channels are one-way channels in which signals flow in only one direction.

\* \* \* \* \*